United States Patent [19]

Amesz et al.

[11] Patent Number: 5,616,391
[45] Date of Patent: Apr. 1, 1997

[54] COMPOSITE MATERIAL AND A COMPOSITE STRUCTURE BASED ON A THREE-DIMENSIONAL TEXTILE STRUCTURE

[75] Inventors: Willem Amesz, St. Martens; Joris K. M. Van Raemdonck, Bazel; Willy De Meyer, Gent; Ignace H. J. M. Verpoest, Kessel-Lo, all of Belgium

[73] Assignee: K.U. Leuven Research & Development, Belgium

[21] Appl. No.: 373,191

[22] PCT Filed: Jul. 13, 1993

[86] PCT No.: PCT/BE93/00048

§ 371 Date: Jul. 10, 1995

§ 102(e) Date: Jul. 10, 1995

[87] PCT Pub. No.: WO94/01272

PCT Pub. Date: Jan. 20, 1994

[30] Foreign Application Priority Data

Jul. 13, 1992 [BE] Belgium .................................. 9200649

[51] Int. Cl.⁶ .............................. B32B 1/02; B32B 1/06; B32B 5/22; B32B 5/28
[52] U.S. Cl. .......................... 428/71; 428/92; 428/304.4; 428/309.9; 428/314.4; 442/315; 442/318; 442/319
[58] Field of Search ............................ 428/92, 246, 252, 428/253, 254, 304.4, 309.9, 314.4, 71

[56] References Cited

U.S. PATENT DOCUMENTS

| 5,334,442 | 8/1994 | Okamoto et al. ........................ 428/246 |
| 5,395,684 | 3/1995 | Robinson et al. ...................... 428/253 |
| 5,413,837 | 5/1995 | Rock et al. ............................... 428/253 |
| 5,418,044 | 5/1995 | Maliler ..................................... 428/253 |

FOREIGN PATENT DOCUMENTS

| 0339227 | 11/1989 | European Pat. Off. . |
| 0384140 | 8/1990 | European Pat. Off. . |
| 0402708 | 12/1990 | European Pat. Off. . |
| 0424215 | 4/1991 | European Pat. Off. . |
| 3139402 | 4/1983 | Germany . |
| 3903216 | 8/1990 | Germany . |
| 9013194 | 11/1990 | Germany . |

OTHER PUBLICATIONS

F. Horsch, *Dreidimensionale Verstarkungsmaterialien fur Faserverbudstoffe*, Kunststoffe, vol. 80, No. 9, Sep. 1990, pp. 1003–1007.

*Primary Examiner*—James C. Cannon
*Attorney, Agent, or Firm*—Webb Ziesenheim Bruening Logsdon Orkin & Hanson, P.C.

[57] ABSTRACT

The invention relates to a composite material comprising a three-dimensional textile structure which comprises at least two textile layers which are located at a mutual distance and which are mutually connected by looped-round pile threads, and at least one matrix with which at least this textile layer is provided, and a vapour/moisture-permeable textile layer contacting the body.

20 Claims, No Drawings

COMPOSITE MATERIAL AND A COMPOSITE STRUCTURE BASED ON A THREE-DIMENSIONAL TEXTILE STRUCTURE

BACKGROUND OF THE INVENTION

1. Field of the Invention

The present invention relates to a composite material having a substantially sandwich-like structure. This sandwich structure comprises two layers formed by threads mutually connected by pile threads.

2. Description of the Prior Art

A known composite material comprises two layers in the form of web layers, while the pile threads couple the two web layers. A composite material based on a three-dimensional web has the drawback, however, that the layers are substantially vapour and/or moisture-proof and are therefore unsuitable for use in contact with the human/animal body. In addition the use of web layers has the drawback when one or both of the web layers is provided with a matrix, that a closed layer is created which is not moisture/vapour-permeable. While it is the case that a composite material based on three-dimensional webs is vapour/moisture-permeable, it is insufficiently strong and rigid. This could be improved by covering knitted layers with flat strengthening materials, whereby they become impermeable. Kunststoffe, vol. 80, no. 9, September 1990, pages 1003–1007 discloses a composite comprising an additional covering layer for the provision of sufficient strength to a sandwich structure.

SUMMARY OF THE INVENTION

The invention has for its object to provide a composite material substantially not displaying the above stated drawbacks, which has transversal and/or lateral vapour and/or moisture-permeating properties and is suitable for use in connection to or in contact with the human or animal body. Critical for this application is the combination of stiffness-impact resistance-air permeability at the lowest possible weight.

This object is achieved by a composite material comprising a three-dimensional textile structure which comprises at least two textile layers which are located at a mutual distance and which are mutually connected by looped-round pile-threads, wherein at least one of the textile layers is embedded in a matrix and at least one of the textile layers is vapor/moisture permeable.

DESCRIPTION OF THE PREFERRED EMBODIMENTS

Optimal stiffness, dependent on the curvature of the composite material which may be in a number of directions, is achieved by adapting the architecture of the textile layers. In the case of a knitted material the cell size may vary from for instance 3–5 mm and the cell shape can be hexagonal or diamond-shaped. An additional increase in stiffness can be obtained by knitting stretched and/or weft threads into the knitted material layers.

An optimum impact resistance is obtained by a choice of the pile thread density and of the bending resistance properties of the pile threads. This latter can be achieved by increasing the moment of inertia of the pile threads, for instance by enclosing supporting yarns (glass, aramide, polyester etc.) with a thicker matrix layer of for instance a thermoset (after impregnation with a liquid) or a thermoplast (in which case the pile yarns are braided and/or spun and subsequently melted).

The skin compatibility is achieved optionally by the choice of the threads for the textile layer (knitted, web, non-woven material etc.) and optionally by filling a least a part of the space between both textile layers with an open or closed cell foam. This composite material can be joined to an adjoining other composite material by adhering thereon etc., and on the other hand the composite material can be integrated with other composite materials according to the invention by fusing or setting with thermosets respectively thermoplasts.

In preference the vapour/moisture-permeable textile layer consists of a knitted material layer because the knitted threads have a mutually curved form and, with curving in two directions, this does not result in tensions in the knitted material layers and the looped-round pile threads. An alternative to a knitted material layer is the use of a web layer. However, known web layers applied in three-dimensional textile structures are closed. The web layer can be so adapted that square or rectangular openings are created between the rows of chain and weft threads to which the piles are attached. Weft threads can for instance be omitted or chain threads woven together.

Threads are at least coated with matrix material by impregnation. The latter can be performed according to different methods such as coating, immersion, (foil) melting and the like. Moreover, an open or closed layer can be formed during impregnation of one or more textile layers depending on the density of for instance the knitted material.

A composite material according to the invention of which only one textile layer is impregnated with the matrix therefore has a hard and a soft side.

The shock resistance of such a composite material can be increased when more preferably the web layer and the pile threads are impregnated with a matrix. These composite materials are highly shock resistant, permeable to moisture or vapour and have excellent mechanical properties relative to the weight in the case of objects with a double-curved surface.

Subject to the intended application (in particular with a view to shock resistance and moisture or vapour permeability), the same or different matrix materials can be used for the matrix for the web layers and for the pile threads.

To increase the compression rigidity and compression strength, the shear strength and to a certain extent the peeling strength, it is further recommended that the space located between the two textile layers is at least partially filled with a filler material, wherein in preference the filler material is a preferably open-cell foam.

The compression resistance of the composite material can be further adapted by selecting a suitable pile thread density per unit of surface. The pile thread density per unit of surface amounts in general to 10–1000 pile threads/$cm^2$, preferably 30–500 pile threads/$cm^2$.

The textile structures to be used can be made in three-dimensional or two-dimensional forms by for instance weaving, knitting, braiding, layering, tufting, non-woven forming, sewing, glueing, fusing and/or adhering.

Diverse types of material can be used for the textile layers and for the pile threads. The threads can be formed from monofilaments, multifilaments or from spun yarns. Suitable threads are single or compound threads, the melting points of which are different so that by specific heating, optionally with application of pressure, one or more yarns fuse while one or more other yarns form the reinforcing element. The use of different types of threads can be embodied in the form of so-called bi-component threads, wherein fibres with different melting points are combined.

The threads can also be admixed by using chain and/or weft threads of different composition in determined or non-determined sequence during the textile process, for instance weaving. The materials used can lie at an angle of 0°–90° or at inclining angles.

The textile layer can also be tufted, whereafter the thermoplastic (or mixed) pile threads are melted at their turn ends such that the tops of the pile threads form a closely joined whole due to a whole or partial joining of the melted pile thread tops. These partly melted pile thread tops can also be used as an adhering position for a rapid join to a skin-compatible layer by adhering the hooks of the frizzed fibres or by thermoplastic connection to the portion of the thermoplastic fibres of this skin-compatible layer.

An example of a thermoplastic composite pile thread comprises a thread composed of a glass fibre with a volume ratio of 40% glass to 60% enclosing or co-extruded polyester (PET). An example of a skin-compatible material is given by a spun fibre consisting of 60% viscose-rayon and 40% polyethylene.

In general the threads can consist of synthetic fibres such as glass fibres, carbon fibres, aramide fibres, polyester fibres, natural fibres such as cotton fibre and flax fibre, metal fibres and also ceramic fibres.

When the web layer or pile threads are wrapped round and/or impregnated with a matrix material, glass fibres, polyester fibres, aramide fibres or combinations thereof are preferably used.

If no impregnation takes place and the composite material comes into contact with for instance the human body, it is recommended to use for the knitted material layers and possible pile threads a biocompatible fibre such as skin-compatible fibres (viscose fibres, cotton fibres and other moisture-absorbing fibres).

As a matrix thermosetting polymers can be used such as epoxy resins and polyester, which can be applied by impregnation to the textile layer threads and possible pile threads, thermoplastic polymers such as polycarbonate, and finally elastomers such as natural or synthetic rubber in addition to silicon rubber.

The composite material can also be composed of threads wherein the threads consist partially or wholly of composite yarns having a mutually differing melting point. The portion melting at lower temperature is used as fibre matrix for the total composite, for instance piles consisting of a monofilament PET having therearound a fibre which melts at a lower temperature than PET.

As foam an open or closed cell foam can be used in addition to a thermosetting or thermoplastic polymer or elastomer optionally filled with fibrous material such as wood chippings, wood dust, textile fibres and other filler material.

A preferred material for the foam comprises polyurethane foam. For specific applications a filter material can optionally be applied such as for instance active carbon.

The composite materials according to the invention which may be curved in two directions can be manufactured in accordance with a number of production methods. Conventional methods comprise deep-draw pressing, vacuum-forming, non-isotherm pressing and the like.

The composite materials according to the invention can be employed in very diverse articles. For instance articles for protecting the human and animal body or for supporting the human body, for example helmets, leg, arm and shoulder protectors, seats, stretchers, corsets and mattresses.

Finally, the invention relates to a composite structure which is composed of one or more composite materials according to the invention which are joined to mutually adjoining textile layers, for instance by looping, weaving or stitching. In this case looping has preference since the curving in two directions of the composite structure according to the invention is then ensured to the maximum extent.

Mentioned and other features of the composite material and the composite structure according to the invention will be further elucidated hereinbelow on the basis of a number of embodiments, which are given only by way of example and to which the present invention is in no way limited.

EXAMPLE 1

A three-dimensional knitted material (cell size 8 mm, cell shape hexagonal) is formed, wherein one of the knitted material layers is impregnated with a matrix and the other knitted material layer and the pile threads are substantially not impregnated. The composite material becomes very hard on one side although this side remains porous.

Used for the hard knitted material layer impregnated with matrix are glass fibres, polyester fibres or aramide fibres. For the other knitted material layer and the pile threads a biocompatible, skin-compatible fibre is used.

As matrix use can be made of a thermosetting resin or a thermoplastic resin. In the case of a thermosetting resin, for instance epoxy resin, the knitted material layer can be impregnated using a so-called hot-melt foil, whereby substantially the knitted material threads are impregnated and the interspaces remain open. Setting takes place in a mould, whereby the desired curvature can also be given to the composite material.

In the case a thermoplast is used such as polycarbonate or even polypropylene, the thermoplast is again applied via foil, wherein the curving of the composite material takes place in a mould (for example based on a plaster cast of a patient), or by heating followed by deforming.

The shaped composite material which has on one side a hard knitted material layer can be applied for seats, corsets, mattresses, stretchers and body part protectors.

Because both knitted material layers and the space between the pile threads is open, it is possible to drain moisture and the like through the composite material.

EXAMPLE 2

A composite material is manufactured wherein each of the knitted material layers is impregnated with matrix material, resulting in two hard knitted material layers having therebetween a resilient layer of pile threads. Compared to the composite material of example 1 a greater shock resistance is obtained.

It is moreover possible with this composite material to join the edges together by pressing the knitted material layers against each other on the edges and causing the matrix material to melt along the edges. The formed composite material for use as a shin-guard is provided on the concavo-convex side with a two-dimensional textile structure in the form of an open non-woven layer filled with an open cell foam. This textile structure is adhered by melting to the adjoining knitted material layer of thermoplastic resin threads.

EXAMPLE 3

A composite material is manufactured wherein both knitted material layers as well as the pile threads are impregnated with matrix material.

Use can be made for knitted material threads and for pile threads of aramide fibres, polyester fibres, glass fibres and combinations thereof. Glass fibres are preferably used for the pile threads.

The matrix material can be a thermoplast such as polycarbonate or a thermoset such as epoxy resin.

The impregnating of both knitted material layers and the pile threads takes place by immersion in the liquid matrix material and subsequent setting of the composite material in a mould, whereby the desired complicated shape can be given to the composite material. Such a material is very shock resistant and can be employed for instance for helmets, wherein transpiration moisture can escape through the helmet to the outside. The composite material manufactured for this purpose is combined with a composite material that is prepared in example 1, wherein the non-impregnated soft knitted material layer is manufactured from skin-compatible fibres.

Joining together takes place in the further course of the production process by fusing the impregnated mutually adjoining knitted material layers of both composite materials in the case of thermoplasts or by setting together in the case of thermosets.

EXAMPLE 4

A composite material manufactured in the preceding example 3 can then be provided with a filling in the form of an open cell foam, for instance polyurethane foam. Making use of the foam results in a composite material with an even greater compression rigidity and compression strength, a greater shear strength and still greater shock resistance. The insertion of the foam can take place by introducing and foaming foam material after full setting of the composite material. These composite materials can be used for very light and very shock resistant helmets and body protectors.

In the case that the knitted material layers are impregnated with matrix material such that closed knitted material layers are created, instead of the foam a filler material can be incorporated in the composite material such as a liquid, a gas. The composite materials can thereby be used as storage tanks for gas and/or liquid, which tanks may possess a complex external form.

EXAMPLE 5

A composite structure is formed by joining together a composite material prepared in example 1 and a composite material prepared in example 3 by glueing together mutually adjoining knitted material layers or joining them mechanically in other manner. Thus created is a composite material with extremely good compression rigidity, compression strength and shock absorbance for use in very extreme conditions. Although in the examples mainly composite materials are used with textile structures based on a knitted material, it will be apparent that other types of textile structure can also be used such as webs, braids, tuft structures, non-woven structures, either separately or in combination.

EXAMPLE 6

A composite material prepared in example 3 is used, wherein the pile threads are braided and have a diameter up to about 1 mm. This fully impregnated composite material is joined to a composite material prepared in example 3 with interposing of a plastic protective plate which may or may not be perforated. The composite materials and the protective plate are mutually joined by means of a contact adhesive based on acrylate. This results in a helmet structure with a very hard outer shell, wherein via the protective layer an optimum distribution of the load is possible via the plate to the soft composite material lying thereunder which is moisture/vapour-permeable.

EXAMPLE 7

A composite material prepared in example 1 is provided on one of its textile layers with a hard plate on the basis of a thermoplast such as polycarbonate. The composite material and the hard plate are joined together by fusing of the thermoplasts at the position of the adjoining textile layer. Thus results a leg guard with optimal protective properties and optimal skin-compatible properties, since moisture and vapour can be drained via the space present in the soft composite material.

We claim:

1. A composite material comprising a three-dimensional textile structure which comprises at least two textile layers which are located at a mutual distance and which are mutually connected by looped-round pile-threads, wherein at least one of the textile layers is embedded in a matrix and at least one of the textile layers is vapor/moisture-permeable.

2. A composite material as claimed in claim 1, wherein the vapour/moisture-permeable textile layer is formed from body-compatible fibres.

3. A composite material as claimed in claim 1, wherein the pile threads are provided with a matrix.

4. A composite material as claimed in claim 1, wherein the vapour/moisture-permeable textile layer is at least one of an open-weave web layer and an open non-woven layer.

5. A composite material as claimed in claim 1, wherein the vapour/moisture-permeable textile layer is a body-compatible textile layer.

6. A composite material as claimed in claim 1, wherein a space located between the two textile layers is at least partially filled with a filler material.

7. A composite material as claimed in claim 6, wherein the filler material is a preferably open-cell foam.

8. A composite material as claimed in claim 1, wherein the pile thread density per unit of surface amounts to 10–1000 pile threads/$cm^2$.

9. A composite material as claimed in claim 1, wherein the matrix comprises at least one of an organic material and an inorganic material.

10. A composite material as claimed in claim 1, wherein an impregnated textile layer is formed having fibres selected from the group consisting of glass fibre, polyester fibre, carbon fibre and aramide fibre.

11. A composite material as claimed in claim 1, wherein at least one textile layer is a knitted material layer.

12. A composite material as claimed in claim 11, wherein the vapour/moisture-permeable textile layer is at least one of an open-weave web layer and an open non-woven layer.

13. A composite material as claimed in claim 11, wherein the vapour/moisture-permeable textile layer is a body-compatible textile layer.

14. A composite material as claimed in claim 11, wherein a space located between the two textile layers is at least partially filled with a filler material.

15. A composite material as claimed in claim 11, wherein the matrix comprises at least one of an organic material and an inorganic material.

16. A composite structure comprising at least one composite material including a three-dimensional textile structure which includes at least two textile layers which are located at a mutual distance and which are mutually connected by looped-round pile-threads, wherein at least one of the textile layers is embedded in a matrix, at least one of the textile layers is vapor/moisture-permeable and wherein the composite material is joined to another composite material with a sandwich structure by mutually adjoining textile layers.

17. A composite structure as claimed in claim 16, comprising one or more composite materials joined by mutually adjoining textile layers.

18. A composite structure as claimed in claim 16, wherein the mutually adjoining textile layers are joined by at least one of looping, weaving and stitching.

19. A body protector, comprising at least one layer of a composite material including a three-dimensional textile structure which includes at least two textile layers which are located at a mutual distance and which are mutually connected by looped-round pile-threads, wherein at least one of the textile layers is embedded in a matrix, and at least one of the textile layer is vapor/moisture-permeable.

20. A body protector as claimed in claim 19 configured as a helmet.

* * * * *